Oct. 11, 1938.   J. GALAMB ET AL   2,132,729
AUTOMOBILE SEAT CONSTRUCTION
Filed Jan. 13, 1938
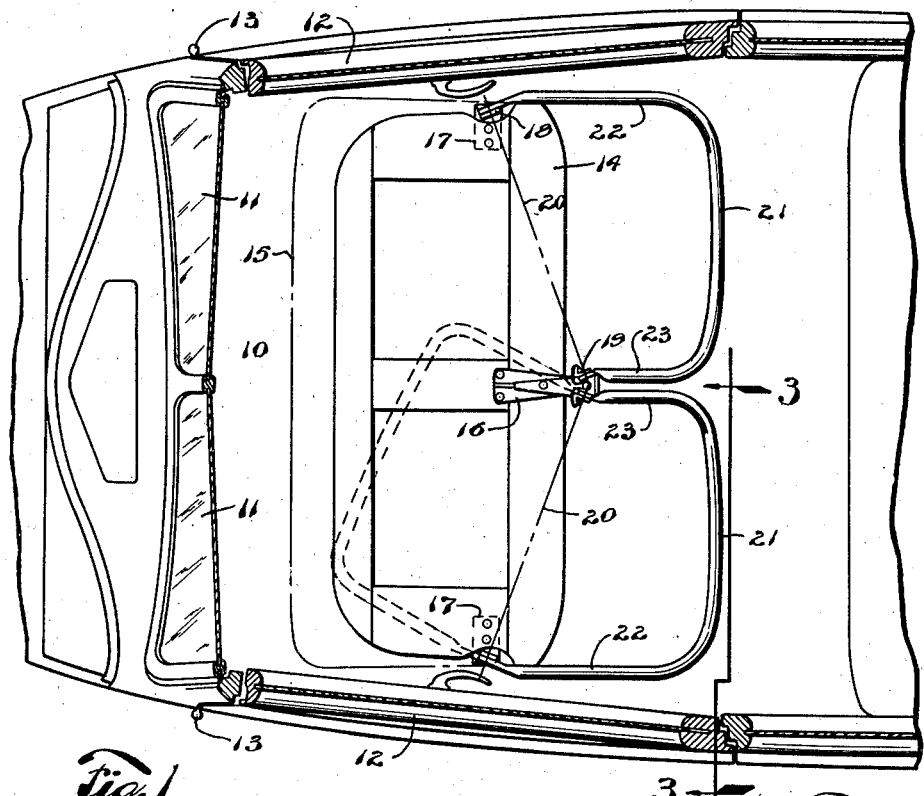
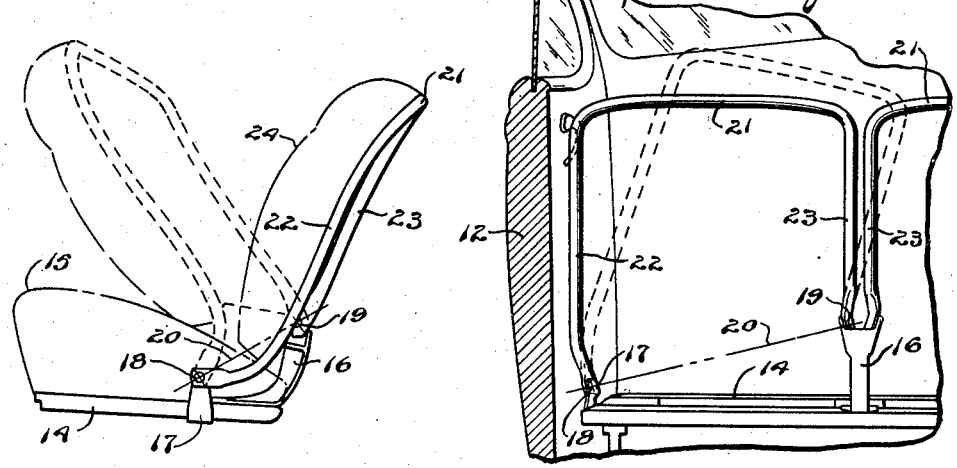
INVENTORS
J. Galamb
C. F. Kramer
E. C. McRae
C. L. Davis.
ATTORNEYS.
WITNESS
E. Witzke Patented Oct. 11, 1938

2,132,729

UNITED STATES PATENT OFFICE 2,132,729

AUTOMOBILE SEAT CONSTRUCTION

Joseph Galamb and Clarence F. Kramer, Detroit, Mich., assignors to Ford Motor Company, Dearborn, Mich., a corporation of Delaware Application January 13, 1938, Serial No. 184,730

5 Claims. (Cl. 155—5)

The object of our invention is to provide an automobile seat construction of simple, durable and inexpensive construction.

A further object of our invention is to provide an automobile seat construction especially adapted for use in closed cars of the "Tudor" model. Such bodies are provided with only one door in each side thereof but are equipped with both front and rear seats extending thereacross. Our invention consists of an improved front seat construction wherein the seat backs may be swung forwardly to permit easier ingress or egress through either door from the rear seat of the car.

Still a further object of our invention is to provide a front seat back construction which swings forwardly and inwardly to clear the door operating handles so as to allow the use of a seat back which extends the full width of the car body. In the streamlined automobiles used today, the bodies have a width at their center portions nearly the full width of the car. Further, in the "Tudor" type body the back of the front seat is located substantially at the center of the car and, for comfort, should be nearly the full width of the body at this point. However, with the conventional seat back hinge, a full width back interferes with the door operating handles when in forward position and is objectionable for this reason. This is particularly annoying when the driver or passenger, after getting out of the car, swings the front seat forwardly in order to remove a bundle or the like from the rear compartment and then attempts to close the door without first replacing the seat to its rearmost position. Returning the seat before closing the door is very inconvenient when a person has packages to carry. If the seat is not returned, the door strikes against the seat back and cannot be closed.

For this reason many manufacturers are providing backs on the front seats which only extend a portion of the width across the car.

Our improved seat construction is designed to overcome this defect by causing each half of the seat back to swing forwardly and inwardly so as to clear the door and all parts thereof in any of its positions.

Still a further object of our invention is to provide a split seat back for the front seats of automobiles which will allow the use of a complete cushion over the full front seat. Heretofore the center hinge arms of such seat backs interfered with the cushion, if same were made complete, and consequently this cushion was provided with a U shaped vertical groove through its rearmost edge at the center so that the hinge arms in their forward positions would not strike against the cushion. The backs could not be hinged at a point above the cushion because in this case the back would not swing forwardly enough to give access to the rear seat. The above-mentioned U shaped opening in the cushion was objectionable because gloves, etc., would drop through the cushion.

With our improved construction, a complete cushion is used and still the seat back will swing forwardly to a position giving easier access to the rear seat than was heretofore possible.

With these and other objects in view, our invention consists in the arrangement, construction and combination of the various parts of our improved device, as described in the specification, claimed in our claims, and illustrated in the accompanying drawing, in which:

Figure 1 is a plan view of our improved seat construction, the cushion springs, upholstery, etc., being removed to thereby better illustrate the seat back hinge construction.

Figure 2 is a side view of the seat, shown in Figure 1, illustrating in dotted lines the position of the seat back when swung forwardly, and Figure 3 is a sectional view, taken on the line 3—3 of Figure 1.

Referring to the accompanying drawing, we have used the reference numeral 10 to indicate the floor of an automobile body, said body having a windshield 11 and doors 12 positioned in the conventional manner. The doors 12 are hinged at 13 to pivot around their forward edges. A front seat frame 14 is secured to the floor 10 and extends thereacross between the doors 12, the frame 14 having a cushion 15 mounted thereon. A bracket 16 is fixed to the center portion of the frame 14 and extends upwardly from its rearmost edge to a considerable height above the adjacent portion of the cushion 15. A pair of side brackets 17 are fixed to the respective ends of the frame 14, each of which brackets are positioned a substantial distance forwardly from the top end of the bracket 16. The brackets 17 are also considerably shorter than the bracket 16 so that lines joining the upper ends of the brackets 17 with the upper end of the center bracket 16 will extend rearwardly and upwardly toward the center of the car. The upper ends of the brackets 17 are provided with pivot pins 18 while the upper end of the bracket 16 is provided with two pivot pins 19. One of the pins 18 is axially aligned with one of the pins 19 while the other two of said pins are likewise axially aligned with each other. These axes are shown by lines 20 in the drawing.

A seat back is adapted to pivot around each of the axes 20. Each seat back is constructed around a frame 21, which frames are provided with inner and outer arms 23 and 22, respectively. These arms extend downwardly from a horizontal top section, the outer arms 22 being materially longer than the inner arms 23 so that the arms may be pivoted to the pins 18 and 19, respectively. A seat back cushion 24 is upholstered around each frame 21 in the conventional manner.

Due to the rearwardly and upwardly inclined axes 20, each seat back when swung forwardly on its axis swings inwardly to the position shown by dotted lines in the drawing. From Figure 1 it will be noted that considerably more room is provided for access to the rear seat when the seat back is tipped forwardly than is provided in the conventional car. Further, from Figure 3, it will be noted that when the seat back is moved forwardly, the seat frame 21 moves inwardly away from door operating handles. Thus, the edges of the seat back may be padded to extend the full width of the body, and still the doors may be closed with either back in its forward position.

The many advantages arising from the use of our improved device, may be summarized by stating that greater access is had to the rear seat of the car without increasing the width of the car door or moving the front seat as a whole forwardly. Further, a seat back running substantially the full width of the car may be provided and still interference with the doors or window operating mechanism will be avoided in any position of the back. Still further, the seat cushion may be made without the usual center channel therein, to thereby improve the utility of the seat.

Some changes may be made in the arrangement, construction and combination of the various parts of our improved device without departing from the spirit of our invention, and it is our intention to cover by our claims such changes as may be reasonably included within the scope thereof.

We claim as our invention:

1. An automobile closed body construction characterized by its having front and rear seats therein and having a single door in one side thereof, said door being longitudinally positioned in alignment with said front seat, and a seat back positioned adjacent to said front door hinged to the rear edge of said front seat to swing forwardly around an axis which extends from the lower center portion of said door rearwardly and upwardly toward the center of the body.

2. An automobile closed body construction characterized by its having front and rear seats therein and having a single door in each side thereof, said doors being longitudinally aligned with said front seat, and a pair of seat backs hinged to the rear edge of said front seat, said seat backs having their upper edges in substantial alignment, the hinge axes of said seat backs extending respectively from the lower central portions of the doors rearwardly and upwardly toward the center of the body.

3. An automobile closed body construction characterized by its having front and rear seats therein and having a single door in each side thereof, said doors being longitudinally aligned with said front seat, a hinge bracket extending upwardly from the central portion of the rear edge of said front seat, side hinge brackets extending upwardly a lesser distance from the intermediate portions of the side edges respectively of said front seat, and a pair of seat backs arranged side by side having their adjacent edges pivoted to the upper end of said central bracket and having their outside edges pivoted to said side brackets so that each of said seat backs when swung forwardly will move inwardly, for the purpose described.

4. An automobile seat construction comprising, a seat frame extending across the center portion of said automobile, a cushion mounted upon said frame, a center hinge bracket secured to the central portion of said seat frame, which bracket extends upwardly therefrom in substantial alignment with the rear edge of said frame, side hinge brackets secured to the sides of said frame intermediate of its front rear edges, which side brackets extend upwardly therefrom to a height considerably less than the height of the said center hinge bracket, pivotal connections in the upper ends of said brackets, and a pair of seat backs hinged to said frame by said pivotal connections, the top ends of said seat backs being substantially aligned when in their extended positions.

5. An automobile seat construction comprising, a seat frame extending across the center portion of said automobile, a cushion mounted upon said frame which extends across said automobile, a center hinge bracket secured to the central portion of said frame which bracket extends upwardly to position adjacent to the upper face of said cushion, side hinge brackets secured to said frame which extend upwardly from each side thereof to a height less than the upper face of said cushion, said side brackets being positioned intermediate of the front and rear edges of said frame, pivot pins mounted in the upper ends of said brackets, and pair of seat backs arranged in substantial lateral alignment with the rear edge of said cushion, the adjacent edges of said seat backs being pivoted to the upper end of said central bracket and the outside edges of said seat backs being pivotally connected to said side brackets, respectively, for the purpose described.

JOSEPH GALAMB.
CLARENCE F. KRAMER.